Sept. 4, 1962          H. HURVITZ          3,052,843

FREQUENCY MEASURING AND PHASE MEASURING SYSTEMS

Filed June 1, 1955

INVENTOR

Hyman Hurvitz

United States Patent Office 3,052,843
Patented Sept. 4, 1962

3,052,843
FREQUENCY MEASURING AND PHASE MEASURING SYSTEMS
Hyman Hurvitz, 737 Warner Bldg., Washington, D.C.
Filed June 1, 1955, Ser. No. 512,388
17 Claims. (Cl. 324—77)

The present invention relates generally to frequency measuring and phase measuring systems, and more particularly to systems for measuring phase and frequency, which utilize light valving and integrating techniques for the effective correlation of frequencies and phases.

Briefly describing the present invention, a plurality of concentric rings, or loops of a helix, are impressed as transparent areas of a disc. Each ring is of variable transparency circumferentially, the variation proceeding sinusoidally around each circumference. The difference in frequency of the sinusoids, as between successive rings, is equal to a fraction of a cycle, less than 90°, and preferably of the order of 36°, or less, where frequency is to be measured, and down to a small fraction of degree, where accurate phase measurements are of interest. The total radial extent of each ring may be slight, of the order of .005″.

A light beam illuminates the entire disc, and through the disc illuminates the photo-sensitive surface of an iconoscope. If the light beam be sinusoidally modulated in intensity, about a mean value, at the same frequency as some one of the sinusoids of the disc, when rotating, would modulate a light beam of constant intensity, and if the modulated beam be passed through the rotating disc, the light will become doubly sinusoidally modulated. It will be modulated in its inception, and this may occur in response to an electrical signal, and again by its passage through the rotating disc. The passage of the light beam through the disc is then equivalent to multiplication, by a sinusoidally varying fractional quantity, of the light intensity originally present in the light.

If the original intensity of light be $K+A \sin \omega_1 t$ and if the modulation caused by the disc be as $B \sin(\omega_2 t + \theta)$ the light emergent from the disc will have amplitude $K+AB \sin \omega_1 t \sin(\omega_2 t + \theta)$ where $\theta$ is a phase angle.

After passage through the disc all the light impinges on a suitable photo-electric surface, which integrates the light intensity over a time interval. To this end, the photo-electric surface of an iconoscope may be employed.

The time integral to infinity of $\sin \omega_1 t \sin(\omega_2 t + \theta)$ is zero if $\omega_1 t = \omega_2$, and if $\omega_1 = \omega_2$ and $\theta = 90°$. If $\omega_1 = \omega_2$ and $\theta = 0°$ the integral equals $\pi$, and if $\theta = 180°$, the integral equals $-\pi$. For intermediate values of angle, the integrated value is intermediate and $\pi$ and $-\pi$.

If the light source is maintained at ambient value, and is not modulated, the photo-electric surface will provide an integrated charge equal to a constant value over the entire surface, despite rotation of the disc, because $$\int_0^\infty \sin \omega t = 0$$

This charge is a measure of ambient light intensity as modulated by the average transparency of the disc.

If the light intensity is modulated about its ambient intensity, and the disc rotated, integrations will be performed by the photo-electric surface, to values depending on the phase and frequency of light amplitude modulation introduced by passage through the disc at each of points radially displaced along the disc. At one radius the latter modulation will be substantially identical in phase and in frequency with the modulation of the input light. At adjacent radii, then, the frequencies may be substantially identical, but the phase relations will be different, and the phase difference will continuously increase in proceeding along the radius. Integrated values of charge at corresponding points of the photo-electric surface will vary, in accordance with the recited phase and frequency relations, and the mathematical relations above given, and will provide a pattern of charges, having radially separated peaks in positive and negative value, with respect to ambient charge. This pattern may be explored by a cathode ray beam, and visually presented on a cathode ray tube or recorder, to indicate the frequency and/or phase of the modulation of the light source, prior to passage through the disc.

If the total pattern on the disc encompasses a relatively wide range of frequencies the device may be employed as a spectrum analyzer. If the total pattern encompasses one cycle per second, or less, the device will measure phase, and accuracy of phase measurement to small fractions of a degree is possible.

In either case the device acts as a filter, and in this respect constitutes a novel instrumentality, i.e. a phase filter which responds only to a narrow range of phase angles for a given frequency.

It is, accordingly, an object of the present invention to provide a novel electro-optical filter.

It is another object of the invention to provide a device for indicating the frequency content of a frequency spectrum by optical filtering, followed by integration.

It is a further object of the invention to provide a device for measuring small phase angles, by techniques of correlation.

It is another object of the present invention to provide a device for recognizing the frequencies present in a modulated light beam.

It is still another object of the present invention to provide a device for measuring sinusoidal variations of a sinusoidally modulated light ray by sinusoidally modulating the sinusoidally modulated light ray in suitable phase, and integrating the resultant light.

It is another object of the present invention to measure phase by means of a light modulator.

The above and still further objects, features and advantages of the present invention will become apparent upon consideration of the following detailed description of one specific embodiment thereof, especially when taken in conjunction with the accompanying drawings, wherein.

Figure 1:
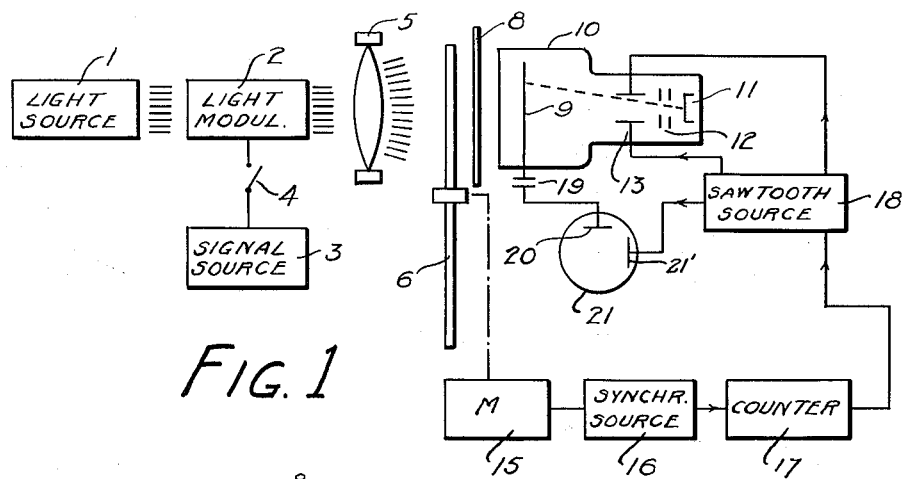
FIGURE 1 is a functional block diagram of a system in accordance with the invention.

Referring to the drawings, the reference numeral 1 denotes a source of light, of constant intensity. The light from source 1 is modulated in intensity by signal applied to light modulator 2 from a source 3 of a band of frequencies. Switch 4 is provided to enable disconnection of source 3.

The modulated light is caused to diverge by means of a lens 5, forming a divergent beam of light, which may be considered to have many rays of light. The divergent beam of light is directed to a light modulator 6. The light modulator 6 is a translucent disc on which has been photographically traced a close spiral 7, the separate turns of which may be a few thousandths of an inch high, so that hundreds of turns of the spiral may exist per radial inch of the spiral. The turns of the spiral are sinusoidally modulated in translucence as one proceeds about any turn and a large number of cycles may be present in each turn, the frequency of the variations of translucence gradually decreasing from a maximum to a minimum in proceeding from the center of the disc outward. The total variation of frequency per turn of the spiral is not greater than ¼ c./s., and preferably is much smaller, say 1/10 cycle/s. or 1/20 cycle/s., although no specific value is required. The spirals are so formed that no spaces occur between the turns, and some overlap of adjacent turns is permissible.

The light emergent from disc 6 passes through a radial aperture 8, and thence onto the photo-electric surface 9 of an iconoscope, or the like, 10.

The iconoscope 10 includes a cathode 11, an electronic lens or beam forming system 12, and electron beam deflection electrodes 13. The beam is caused, by application of sawtooth voltage to electrodes 13, to scan periodically over the illuminated portion of surface 9, and to read off, in a manner well known, per se, the integrated charges developed by the modulated impinging light rays.

The disc 6 is rotated by a motor 15, which also controls a source of synchronizing signal, such as a switch 16, to produce one synchronizing signal per rotation of the disc 6, at an accurately determined phase.

The synchronizing signals provided by source 16 are counted down, by a counter 17, which establishes an output pulse for each predetermined member, say ten, of revolutions of disc 6. The output pulse synchronizes the sawtooth scanning source 18, which in turn provides scanning voltage to scanning electrodes 13.

The output signal produced at photo-electric surface 9 in response to scan thereof is supplied via a D.C. blocking condenser 19 to a vertical deflection electrode, 20, of a cathode ray tube 21. The horizontal deflection electrode 21' of tube 21 is connected to sawtooth voltage source 18, and scans the beam of the tube 21 laterally in synchronism with the beam of iconoscope 10, thereby establishing a frequency representative base line.

The light impinging on disc 6 has an ambient or unmodulated value, and one or more of sinusoidal variations with respect to the unmodulated value. In the case of a single frequency, the amplitude of the light may be written $$K + A \sin(\omega_1 t + \theta_1)$$

where K is the unmodulated value, and $A \sin(\omega_1 t + \theta_1)$, represents the amplitude, frequency, and phase of the modulation.

In passing through the disc 6 the light is further modulated. Assume that the value of K is altered by a fraction $a$, so that the average value of the light emergent from the disc is $aK$. The further modulation is sinusoidal, and may be assumed to be as $$B \sin(\omega_2 t + \theta_2)$$

where B is representative of the maximum variations of translucency which exist in disc 6, and $\sin(\omega_2 t + \theta_2)$ the variations of light intensity introduced by the sinusoidal variations of translucency of spiral 7, due to rotation of the disc 6.

If, at any radial point of the disc the frequencies of the impinging light and of the modulation produced by disc 6 are of the same frequency, the integral of the light ray emergent from the disc may have a finite value, different from $aK$. If the frequencies are different the integrated value will be $aK$. For identical frequency, however, the integral will be a function of the difference between $\theta_1$ and $\theta_2$, and may vary between $\pi$ and $-\pi$, including zero values where $\theta_1 - \theta_2 = \pm 90°$. Considering the entire radius of disc 6, a large number of points will exist for which integrated output light is $aK$, and a few points for which integrated output light varies, as one proceeds along the radius, from 0 to $\pi$ to 0 to $-\pi$. The variations occur because successive spiral turns 7 are at progressively different phases, differing by relatively few degrees, and not more than 90°.

The beam of iconoscope 10 reads the integrated charges on photo-electric surface 9. So long as these charges are proportional to $aK$ they are stopped by condenser 19. Where a rapid variation of charge exists, the read out signal will be passed through condenser 19, and may be applied to vertical deflection electrode 20, preferably after suitable amplification and detection. The points of rapid variation of charge represent frequencies present in the light rays delivered by lens 5, and will appear laterally on the face of cathode ray tube 21 at positions corresponding with frequency.

Obviously, if the entire spiral 7 extends over only a single frequency, or a fraction thereof, fractions of a cycle, or phase may be measured.

Figure 4:
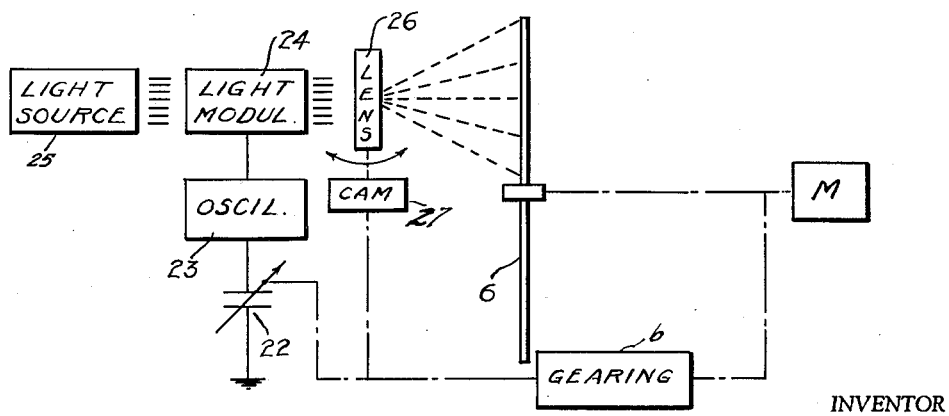
FIGURE 4 is a functional diagram of a device for preparing a modulator plate in accordance with the invention.

The plate 6 may be prepared photographically by the device illustrated in FIGURE 4 of the accompanying drawings. Here the disc 6 is rotated at constant speed by a motor M. The disc is assumed made of photosensitive transparent material, such as photographic film or plate.

The motor M also slowly varies the tuning condenser 22 of an oscillator 23, via step-down gearing $b$. The latter is so arranged that each rotation of disc 6 is accompanied by the desired fractional cycle change in oscillator frequency. The output of the oscillator 23 controls a light modulator 24, capable of sinusoidally modulating light derived from a source 25 about a mean value.

Figures 2, 3:
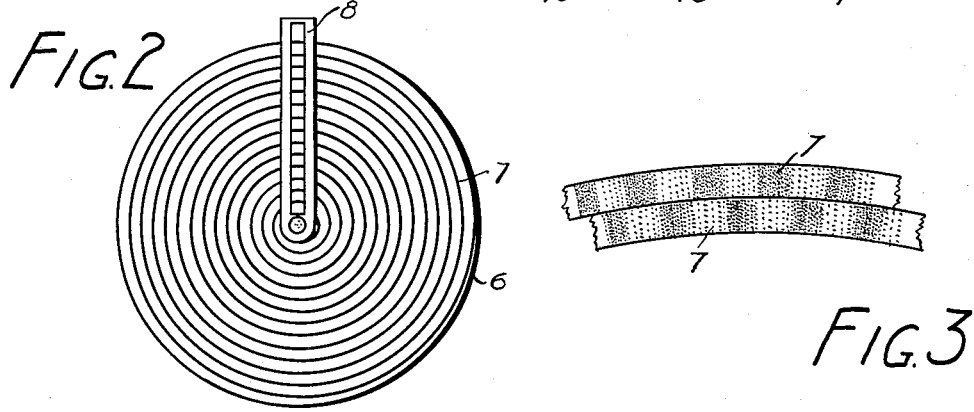
FIGURE 2 is a view in plan of an optical modulator utilized in the system of FIGURE 1.
FIGURE 3 is an enlarged view of a portion of the modulator of FIGURE 2.

The modulated light is directed as a sharp point into disc 6 by means of a lens system 26, and the latter is slowly tilted by means of a cam 27, actuated by motor M. Thereby, as the motor M rotates, and shifts the output frequency of oscillator 23, the point of light impinges on disc 6 varies radially, and a signal path is traced on the disc 6, which is sinusoidally modulated, as required for use in the system of FIGURES 1-3, inclusive.

Clearly, the condenser 22 may control the phase of output of a phase modulator, instead of the frequency of an oscillator, if desired.

The present invention finds particular application for the measurement of extremely low frequencies, i.e. frequencies extending from less than 1 c./s. to 40 c.p.s. It is at these frequencies that scanning spectrum analyzers are particularly difficult to design, and require long scanning times. The present invention also finds particular application to measuring extremely small differences of frequency, of the order of 1 c./s., at relatively high frequencies. This type of measurement is not readily feasible by means of scanning spectrum analyzers.

The system is particularly advantageous because it is "wide open," i.e. measures all the frequencies of a band simultaneously, and because it utilizes no electrical filters, or complicated electronic circuitry.

While I have described and illustrated one specific embodiment of my invention, it will be clear that variations of the general arrangement and of the details of construction which are specifically illustrated and described may be resorted to without departing from the true spirit and scope of the invention.

What I claim is:

1. In combination, a source of a transversely extensive light beam sinusoidally modulatable in amplitude with respect to an ambient value, means for initially modulating the amplitude of said light beam with respect to said ambient value to provide modulated light, said means comprising a light modulator, means for further modulating said modulated light, said means for further modulating including means for modulating adjacent rays of said light at progressively different adjacent phases, means for separately integrating the light intensities of said adjacent rays, and means for visually displaying the integrated values as a plot against a base line.

2. The combination in accordance with claim 1 wherein said means for integrating is a photo-electric surface.

3. The combination in accordance with claim 2 wherein said means for further modulating is a rotatable disc having thereon substantially concentric circular paths, each of said paths having sinusoidal variations of light translucency therealong.

4. In combination, a source of a beam of light having a plurality of transversely adjacent rays, means for modulating the amplitude of said beam of light including all said rays at a plurality of frequencies simultaneously, each of said frequencies having a specific phase at random, a light modulator for modulating selected ones of the modulated rays at frequencies and phases equal substantially to said first mentioned frequencies and phases, means for integrating each of the selected rays over a time period, and means for indicating the amplitudes of the integrated ray.

5. In combination, a source of a beam of light having a plurality of rays, means for modulating all said rays simultaneously in response to a complex wave spectrum, said wave spectrum including waves at a plurality of frequencies, each having a phase, a light modulator for modulating adjacent groups of the modulated rays, each group at a different frequency within said spectrum and the rays of each group at different phases, means for separately integrating each of the rays modulated by said light modulator over a finite time interval, and means for successively reading the amplitudes of the integrated rays.

6. In combination, a source of a beam of light having a plurality of rays arranged along a line transverse to the rays, means for modulating all said rays simultaneously in amplitude in response to a complex spectrum, said spectrum being mathematically representable as a plurlity of sinusoidal waves each at a different frequency, said sinusoidal waves having random phases, a light modulator for modulating each of the modulated rays differently in terms of both frequency and phase, means for displaying each modulated ray over a finite time interval, said light modulator comprising a mechanically moving structure having permanent tracks of sinusoidally modulated translucency and of a different frequency along the length of each separate track.

7. The combination in accordance with claim 6, wherein said light modulator is a transparent plate comprising a spiral track of variable transparency proceeding along the track, said variable transparency being sinusoidal and of different combined frequency and phase for different radial positions of said spiral track.

8. The combination in accordance with claim 7, wherein the frequency of the sinusoidally variable transparency is continuously variable along the entire track.

9. The combination in accordance with claim 8, wherein is provided means for integrating including a single photo-sensitive storage plate, arranged to receive different one of said rays at different points of said plate.

10. The combination in accordance with claim 9, wherein is further provided means for reading the amplitudes of the rays integrated by said means for integrating including a scanning electron beam, and means for effecting scanning of said electron beam across said different points of said plate.

11. In combination, a source of light rays sinusoidally modulatable in amplitude about an ambient value, first means for modulating all said rays in amplitude sinusoidally at a predetermined common frequency and in a predetermined common phase to provide initially modulated light rays, second means comprising a mechanically moving device having tracks of sinusoidally modulated translucency for modulating said initially modulated light rays at said frequency and each at a different phase to provide second modulated light rays, said different phases including said common phase for at least some one of said light rays, and means for distinguishably indicating the light amplitudes of said second modulated light rays.

12. The combination according to claim 11, wherein said means for distinguishably indicating includes a single integrating photo-sensitive surface.

13. A spectrum analyzer, including a source of a complex frequency spectrum, a source of light rays distributed in a line extending transversely of the directions of said light rays, means for modulating the amplitudes of all said light rays in response to said complex frequency spectrum to provide modulated rays, means for modulating the modulated light rays each only at a different frequency in said spectrum to produce doubly modulated rays, and a single surface responsive at different points thereof to different ones of said light rays.

14. A spectrum analyzer including a source of a complex frequency spectrum, a source of plural light rays, means for modulating each of said light rays in amplitude identically in response to said complex frequency spectrum to provide first modulated rays each modulated identically at every frequency of said spectrum and at the phases of said frequencies, means for further modulating said first modulated rays each at a different one only of said frequencies and substantially in the phases of said last-mentioned frequencies, and means for visually displaying each of the further modulated light rays over a time period.

15. The system according to claim 14, wherein said means for displaying includes a single photo-sensitive surface.

16. In combination, a source of a plurality of light rays, means for amplitude modulating all said light rays substantially identically in response to a complex signal containing plural frequencies, a mechanically moving light modulator arranged to move continuously transversely of all said light rays and containing sinusoidally modulated line translucencies, each line translucency having modulation of translucency at a different frequency and each being presented to a different one of said rays.

17. In combination, a source of a light ray, means for modulating the amplitude of said light ray about a mean value in response to a signal having a predetermined frequency component, a continuously moving mechanical light modulator including a track of sinusoidally variable translucency taken along the length of said track, and means for passing said light ray through said track while said track moves transversely of said ray, said track being sinusoidally translucent at a single frequency only.

References Cited in the file of this patent

UNITED STATES PATENTS

| | | |
|---|---|---|
| 2,169,842 | Kannenberg | Aug. 15, 1939 |
| 2,186,203 | Centeno | Jan. 9, 1940 |
| 2,380,666 | Morrison | July 31, 1945 |
| 2,403,983 | Koenig | July 16, 1946 |
| 2,403,986 | Lacy | July 16, 1946 |
| 2,491,190 | Long | Dec. 13, 1949 |
| 2,813,460 | Wallin | Nov. 19, 1957 |
| 2,866,899 | Busignies et al. | Dec. 30, 1958 |